Aug. 18, 1936.　　　E. E. REEVER　　　2,051,394
SICKLE SHIELD
Filed Oct. 15, 1934
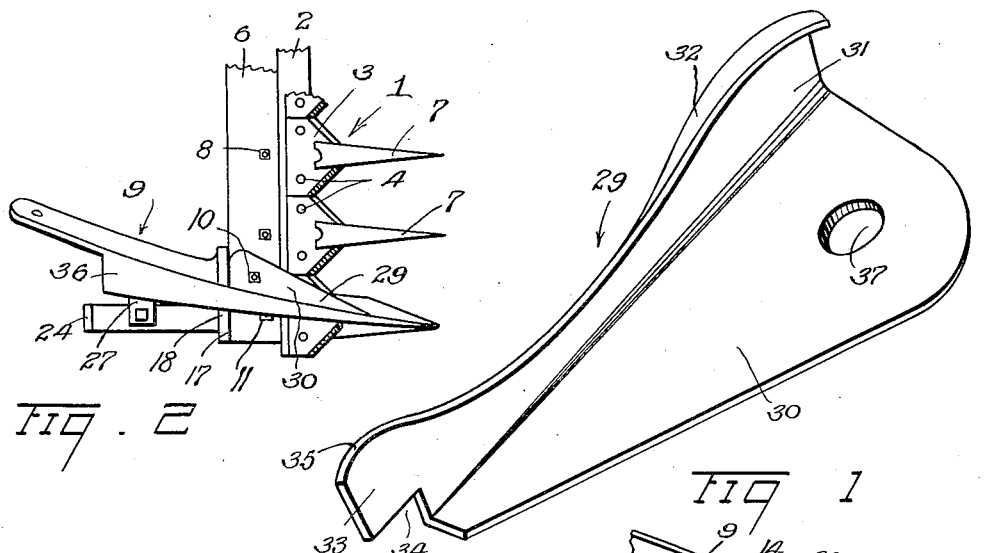
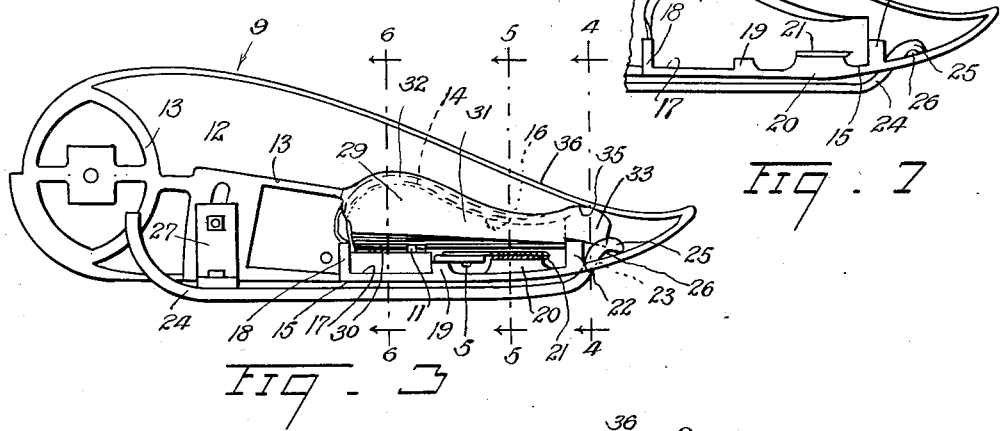
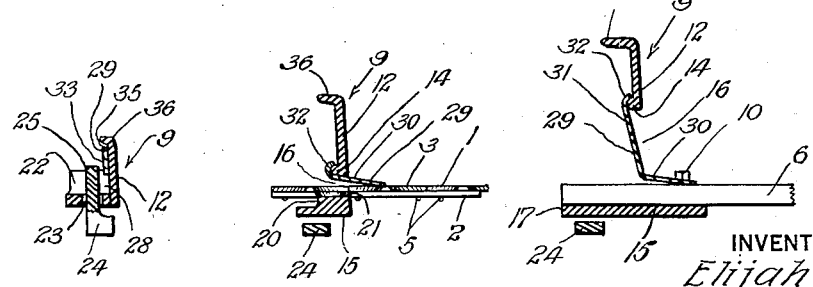
INVENTOR
Elijah E. Reever
BY
ATTORNEY Patented Aug. 18, 1936

2,051,394

UNITED STATES PATENT OFFICE 2,051,394

SICKLE SHIELD

Elijah E. Reever, Walla Walla, Wash.

Application October 15, 1934, Serial No. 748,291

3 Claims. (Cl. 56—303)

This invention relates to sickle shields and has as one of its objects to provide a shield structure that is adapted to conform to a standard outside shoe of an implement intended to cut grain, or the like, as a mower, binder, header, or other similar implement.

Another object of the invention is to provide a sickle shield structure that will prevent clogging of the sickle and thus permit it to operate with less power, and to do faster work, and also prevent the bunching of straw about the shoe whereby to drag along the ground adding resistance to traction and by contacting any obstruction, that the shoe would otherwise pass over, bend or possibly break the sickle.

With these and other objects in view reference is now had to the accompanying drawing in which Fig. 1 is a perspective view of the shield, substantially full size;

Fig. 2 is a plan view (reduced) of a fragment of a sickle showing the shield installed;

Fig. 3 is a side elevation of an outside shoe showing the shield in place;

Fig. 4 is a cross section of the shoe and shield taken on the line 4—4 of Fig. 3;

Fig. 5 is a similar view to Fig. 4 taken on the line 5—5 of Fig. 3;

Fig. 6 is a similar view to Fig. 4 taken on the line 6—6 of Fig. 3, and

Fig. 7 is a side elevation of a fragment of the shoe showing the assembly aperture, with the beam and sickle removed.

Having reference to the drawing, like numerals refer to like parts throughout the several views and the numeral 1 refers to a sickle which consists of a sickle bar 2 to which knives 3 are attached by rivets 4, the heads 5 of the rivets being placed on the under side of the sickle bar with the top of the rivet being flush with the top of the knives 3.

The sickle 1 is mounted for sliding or reciprocatory movement on a beam 6 and is supported operatively thereon by fingers 7 which extend beneath the sickle bar for securement to the beam by means of beam bolts, the nuts 8 only of which are shown, in the usual manner of such assembly and construction.

The outer end of the beam 6 is secured in, and is supported, when the implement is in use, by a shoe 9 to which it is attached, usually by the two bolts which will be termed a saddle bolt and a beam bolt, represented as at 10 and 11 respectively, the beam being held in perpendicular relation to the shoe by a saddle (to be explained) formed in the shoe for the purpose, securement being by the said bolts 10 and 11 above mentioned.

The shoe 9 consists in general of a substantially vertical plate 12, strengthened in the usual manner by ribs 13 disposed on its outer face, and these ribs are continued to provide a rib 14 between which and the bottom part 15 of the shoe is provided an assembly aperture 16.

The purpose of this assembly aperture 16 is to provide for assembling the sickle in the implement (not shown), the sickle being slidably inserted therein into place for its proper function. The saddle 17 therein is of channel section, and formed integral with the shoe, and includes the bottom portion, forming a seat for the beam 6, and is completed by a raised back 18, and a raised front 19, the front having less height than the back whereby to form a support and guide on which the sickle bar 2 will reciprocate, and to maintain the knives 3 at substantially the same height as the top of the beam 6, for a purpose to be explained.

Forward of the raised front 19 there is also provided a raised block 20 upon which is suitably secured a stationary knife 21, and with relation to the height of the raised front 19 its height is such that the sickle knives 3 will operate in cutting contact with the stationary knife in the cutting of the grain.

Between the raised front 19 and the raised block 20 a sufficient space is provided to permit the free passage of the rivet heads 5 during the reciprocation of the sickle bar 2.

Ahead of the block 20 and forming the front boundary of said aperture 16 is a laterally disposed brace 22 integral with the bottom 15 of the shoe, and a vertically positioned aperture 23 (shown dotted in Fig. 3 and in the sectional view in Fig. 4) is provided ahead of this brace, the brace supporting the bottom of the shoe against the weakening thereof which would otherwise be caused by the said aperture 23.

A runner 24 is positioned below and parallel with the bottom of the shoe and has its forward end 25 narrowed transversely to enter this aperture 23, and the narrowed forward end 25 is formed substantially hook shape to secure the runner at its forward end and over a raised portion 26 of the shoe, in the usual manner of such construction and assembly, and, by a clip 27 at its rear end as shown in Fig. 3, for adjustable securement thereof.

By referring to Fig. 4 it will be noted that the front end 25 of the runner 24 does not contact the vertical plate 12 of the shoe 9 and on the contrary that a space, indicated as at 28, exists between these two members, which space is utilized for a purpose to be presently explained.

The sickle shield or structure 29, forming this invention, consists substantially of a horizontally positioned base plate 30, and has a back 31 formed perpendicular thereto, the back terminating at its upper edge in a semi-roll 32 adapted to engage the said rib 14 that forms the upper part of the aperture 16, as shown in Figs. 5 and 6.

The forward end 33 of the shield is left flat to conform to the vertical plate 12 at its point of contact therewith and this end 33 is also provided with a notch 34 on its lower side by which it may rest securely on the said laterally disposed brace 22, and it is also enlarged in vertical dimensions that its upper edge 35 may, by its contact with the top rib 36 of the shoe be secure against vertical displacement, and the said end 33 is further projected to enter the above mentioned space 28 between the forward end 25 of the runner 24 and the said plate 12 for securement therein.

A bolt hole 37 is provided in the base plate 30 of the shield and is positioned so that when the shield is assembled into place the original saddle bolt 10 will secure the plate 30 rigidly in place in contact with the beam 6, whence, with its front end secured as above described, and with the engagement of the rib 14 by the semi-roll 32, the shield 29 will be rigidly secured opposite the aperture.

It is now obvious that with the assembly aperture covered by the vertical back 31 of the shield 29 and with its base plate 30 resting on the said beam 6, and with the sickle knives 3 at the same height (or on a level with) the beam, that no straw can enter this assembly aperture and hence that there can be nothing wedged thereinto that will cause friction therein unduly.

For use the saddle bolt nut is removed and the shield base is then inserted into the assembly orifice from the outside of the shoe, when upon releasing the adjusting means 27 and proper manipulation of the runner the front end of the shield will be secured when the semi-roll will engage the rib as intended.

The runner is then secured back into place, the saddle nut then returned on the saddle bolt that is inserted through the said bolt hole, when the shield will become positively secured.

Following this assembly cutting operations can be started and as the grain is cut the grain adjacent the shoe must pass rearward, passing on beyond the assembly aperture, without any of the straw being drawn in and through this aperture by the reciprocating movement of the sickle bar.

By referring to Fig. 2 it will be noted that the plate of the shoe draws inward at its rear end, and that the point thereof extends outward. This is called the "gather" of the shoe and functions to draw an excess amount of straw between the finger adjacent the shoe and the shoe itself, normally causing additional labor of the implement at this point, then with the added resistance of the grain packing in the assembly aperture, the pack will wedge therein so severely at times that the implement must be stopped and the aperture cleaned with much consequent loss of time.

With the shield in place, and by actual test, the implement runs easier, and with no bunches of straw woven therein there is no liability of breaking the sickle by dragging and catching on uneven parts of the ground, stones or the like.

I claim:
1. In a sickle shield structure, the combination with a shoe having a ribbed vertical plate and a runner adjustably attached to the lower edge of said plate, a rib, a saddle, having a raised back, a sickle guide, a raised knife block, carrying a stationary knife, and a lateral brace, all formed integral with said vertical plate, and disposed and arranged to provide an assembly aperture therein adapted to receive and contain a beam for rigid securement in said saddle, and a sickle mounted for reciprocatory movement against said beam, guided by said sickle guide, and in cooperable relation with said stationary knife, of a shield structure consisting of a base plate adapted for securement to said beam, and positioned to cover said sickle, adjacent said vertical plate, and provided with a vertical back positioned perpendicular to said base plate, said back having a front end disposed and adapted for the securement of said back in contact with said vertical plate by said runner, and positioned to prevent straw passing through said aperture.

2. In a sickle shield structure, the combination with a shoe having a ribbed vertical plate, a top rib, and a bottom part, and provided with a runner having a hook adapted to adjustably and removably secure the runner to said bottom part, a rib, a saddle, having a raised back, a sickle guide, a raised knife block, carrying a stationary knife, and a lateral brace all formed integral with said vertical plate, and disposed and arranged to provide an assembly aperture therewith, in said plate, and adapted to receive and contain a beam, for rigid securement in said saddle, by a saddle bolt, and a sickle mounted for reciprocatory movement against said beam, guided by said sickle guide, and in cooperable relation with said stationary knife, of a shield structure consisting of a tapered base plate adapted for securement to said beam, and having its taper disposed to diminish at the shoe, and disposed to extend through said aperture, and provided with a vertical back positioned perpendicular to said base plate, said back having a front end disposed and adapted for securement of said back with said vertical plate, by the hook of said runner and the said top rib, and positioned to prevent straw passing through said aperture.

3. In a sickle shield structure, the combination with a shoe having a ribbed vertical plate, and a bottom part, and provided with a runner adjustable and removably attached to said bottom part, a rib, a saddle, having a raised back, a sickle guide, a raised knife block, carrying a stationary knife, and a lateral brace, all formed integral with said vertical plate, and disposed and arranged to provide an assembly aperture therein adapted to receive and contain a beam, for rigid securement in said saddle, by a saddle bolt, and a sickle mounted for reciprocatory movement against said beam, guided by said sickle guide, and in cooperable relation with said stationary knife, of a shield structure consisting of a tapered base place adapted for securement to said beam, and positioned to cover said sickle, adjacent said vertical plate, and having its taper disposed to diminish at the shoe, and provided with a vertical back positioned perpendicular to said base plate, said back having a front end disposed and adapted for securement of the said back and said vertical plate by said runner, and positioned to prevent straw passing through said aperture.

ELIJAH E. REEVER.